United States Patent [19]

Bengtsson

[11] Patent Number: 4,611,943
[45] Date of Patent: Sep. 16, 1986

[54] CONNECTOR FOR ASSEMBLING TWO STRUCTURAL MEMBERS

[75] Inventor: Börje Bengtsson, Bjärnum, Sweden

[73] Assignee: Inter-Ikea AG, Lucerne, Switzerland

[21] Appl. No.: 735,637

[22] Filed: May 20, 1985

[30] Foreign Application Priority Data

May 24, 1984 [DK] Denmark .................................. 2549/84

[51] Int. Cl.$^4$ ............................ B25G 3/00; F16D 1/00
[52] U.S. Cl. .................................... 403/22; 403/406.1; 248/188.8
[58] Field of Search ................. 403/21, 22, 406, 407; 248/188.8, 188

[56] References Cited

U.S. PATENT DOCUMENTS

| | | | |
|---|---|---|---|
| 2,602,012 | 7/1952 | Doty | 248/188 UX |
| 2,738,246 | 3/1956 | Hogan, Jr. | 248/188.8 |
| 2,855,256 | 10/1958 | Nelson | 248/188 |

FOREIGN PATENT DOCUMENTS

| | | | |
|---|---|---|---|
| 1207057 | 3/1959 | Fed. Rep. of Germany | 248/188 |
| 1223862 | 2/1960 | France | |

*Primary Examiner*—Andrew V. Kundrat

[57] ABSTRACT

A connector for assembling two furniture parts such as a tabletop and an associated table leg. The connector comprises a screw provided with a head and a relatively long shaft and a bushing with outer holding means and a through hole. The bushing is pivotally mounted on a smooth part of the shaft and is axially fixed as one terminal surface thereof abuts the head of the screw and the opposite terminal surface thereof optionally abuts a locking means projecting from the shaft. One of the terminal surfaces of the bushing comprises a contact knob delimiting the turning of the bushing relative to the screw to an angle less than 350° when it abuts a stop projection projecting from the screw. When a table leg and a tabletop are to be assembled the bushing is initially turned into a hole in the table leg by means of a mounting tool. Subsequently the screw is screwed into the tabletop by turning the table leg about its longitudinal axis until it abuts the tabletop and the desired tightening force has been achieved. Then the table leg can be turned backwards an angle less than 350° until the desired positioning of the table leg relative to the tabletop has been obtained and without changing the tightening force therebetween. As a result a table leg of a cross section corresponding to a triangle can always be secured to a rectangular tabletop and adjusted into its correct position where the right angle of the triangle opposes the right angle of the corner of the tabletop without thereby changing the achieved tightening force between the tabletop and the table leg.

11 Claims, 8 Drawing Figures

CONNECTOR FOR ASSEMBLING TWO STRUCTURAL MEMBERS

FIELD OF THE INVENTION

The invention relates to a connector for assembling two structural members, preferably two furniture parts such as a tabletop and an associated tableleg, said connector comprising a screw provided with a head and a relatively long shaft as well as a bushing comprising a through hole and optionally outer holding means, said bushing being placed on the shaft of the screw.

BACKGROUND ART

French patent specification No. 1,223,862 discloses a connector of the above type allowing a securing of a table leg provided with an internal thread to a tabletop. The connector comprises a screw and a bushing with an external thread. The bushing is secured to the tabletop by the screw being inserted therethrough and screwed onto the tabletop. Subsequently, the table leg is screwed on the bushing by being turned about its longitudinal axis until it abuts the tabletop. A disk is optionally inserted between the bushing and the tabletop, said disk preventing a rotation of the bushing when the table leg is screwed thereon. This connector is, however, not quite satisfactory because two or three loose parts, viz. the bushing, the screw, and optionally the disk, are involved in the assembling of the table leg and the tabletop, which causes a strenuous mounting procedure. Furthermore this connector is encumbered with the draw-back that it is impossible to perform a subsequent adjustment of the turning angle of the table leg when said leg is secured to the tabletop. When a subsequent adjustment is attempted, the tightening force is changed.

The object of the invention is to provide a connector of the above type without loose parts and allowing an assembling of two structural members by a predetermined joining force, and which further allows an angular adjustment of one structural member relative to another structural member within a minor angular interval without thereby changing the joining force which should be of a suitable size.

The connector according to the invention is characterized in that the bushing is turnably mounted on a smooth portion of a shaft and fixed in axial direction, one terminal surface of the bushing abutting the head of a screw and the opposite terminal surface of said bushing optionally abutting a locking means projecting from the shaft, and that one of the terminal surfaces of the bushing comprises a contact knob delimiting the turning of the bushing relative to the screw to an angle less than 350° when abutting a stop projection projecting from the screw.

When two structural members (such as a table top and a table leg) are to be assembled, the bushing is initially secured to one structural member, whereby care is taken that the thread on the screw projects outside the structural member. Subsequently, the structural member and the connector can be secured as a unit onto the second structural member by being screwed into a hole therein. The screwing inwards is continued until the desired joining force has been obtained. Then the first structural member can be turned about the smooth portion of the shaft and consequently relative to the second structural member without reducing the joining force because the bushing can be turned backwards relative to the screw without causing an axial displacement between said bushing and the screw. This turning backwards can, however, only be performed over an angle less than 350°, said angle depending on the position and the size of the stop projection and the contact knob. The connector is furthermore very useful in practice because all the parts are interconnected and appear as a compact unit. The connector turned out to be particularly suited for assembling a table leg of a cross section corresponding to a right-angled triangle to a rectangular tabletop. In the latter case there is only one correct angular position of the table leg, i.e. in its rotation about its longitudinal axis, relative to the tabletop as it is assumed that the table leg is placed adjacent the corner of the tabletop. This is due to the fact that the right angle of the triangle must correspond to the right corner angle of the tabletop.

According to the invention the connector may be free of the locking means, and the stop projection may be situated on the screw in such a manner that beyond serving as a stop for the angular rotation of the bushing relative to the screw it locks the bushing axially relative to said screw.

Moreover according to the invention the stop projection may substantially be formed by a projection projecting from the shaft and as a maximum projecting as far outwards in the radial direction as the bushing. In this manner the connector is inexpensive to manufacture and functions reliably.

Furthermore according to the invention the contact projection may substantially be formed by a projection extending axially from the second terminal surface of the bushing, the axial length of said projection substantially corresponding to the dimension of the stop projection in the axial direction of the screw, optionally slightly smaller than said dimension. Such an embodiment turned out to be very advantageous in practice.

In addition according to the invention the stop projection may be of such a thickness that it allows a maximum turning of the bushing of 340°, preferably 330°, about the screw, whereby the structural members can be angularly adjusted relative to one another in a very easy manner.

Moreover according to the invention the holding means of the bushing may be threads, and the shaft may comprise a preferably transverse hole in the area between the thread of the screw and the bushing, said hole receiving a mounting tool when the bushing is to be screwed into a hole of the first structural member. As a result the bushing is very easily mounted in one structural member such as for instance the table leg.

As the bushing is secured into the first structural member through casting therein before the screw is turned into the second structural member, said first structural member for instance being made of plastics, a very simple securing of the bushing in the first structural member such as for instance the table leg is obtained.

Furthermore according to the invention a resilient member such as a washer may be provided between the first terminal surface of the bushing and the head of the screw in order to achieve an axial prestressing between the bushing and the screw, which provides a certain resiliency between the two structural members.

Moreover according to the invention the bushing and the associated projection may be integral with the table leg, and the stop projection may be situated on the head of the screw and optionally be integral therewith, whereas the contact projection is situated on the terminal surface of the bushing facing the head of the screw, and the locking means may be formed by a locking disk preferably cut up and situated on the screw, preferably through mounting in a groove in the shaft of the screw. As a result the bushing and the associated contact projection can be manufactured simultaneously with the table leg in a very simple manner.

Finally according to the invention the bushing may be secured to the table leg by means of ribs projecting from the walls of the table leg, said ribs preferably projecting from the bushing, and one of these ribs, projecting slightly beyond the remaining ribs, may form the contact projection. In this manner a simple embodiment of the bushing, the contact projection, and the table leg is obtained, whereby these parts can be manufactured for instance through casting.

BRIEF DESCRIPTION OF DRAWING

The invention will be described below with reference to the accompanying drawing, in which.

DETAILED DESCRIPTION OF PREFERRED EMBODIMENTS

Figure 1:
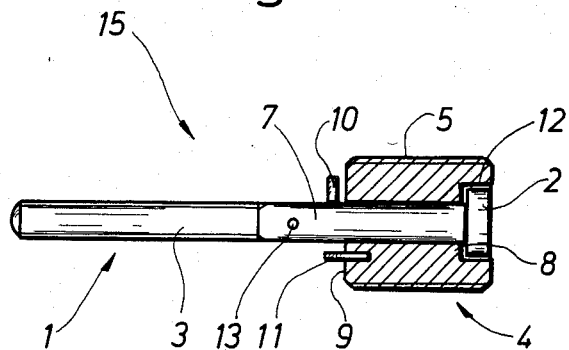
FIG. 1 is a side view of an embodiment of a connector according to the invention, partly in section along the line I—I of FIG. 2.
Figure 2:
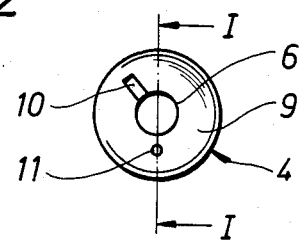
FIG. 2 is an end view of the embodiment of FIG. 1.
Figure 3:
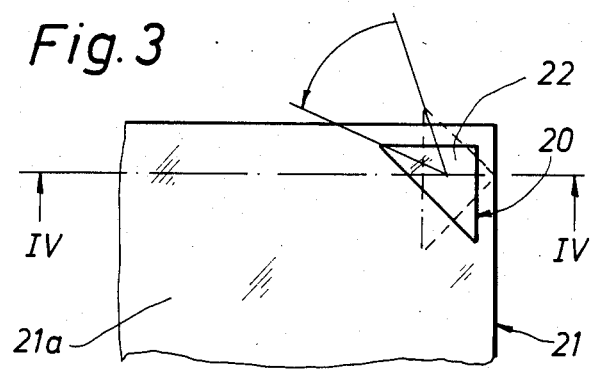
FIG. 3 is a bottom view of the connector according to the invention used for assembling a tabletop comprising a 90° corner and a table leg of a cross section corresponding to a right-angled triangle.
Figure 4:
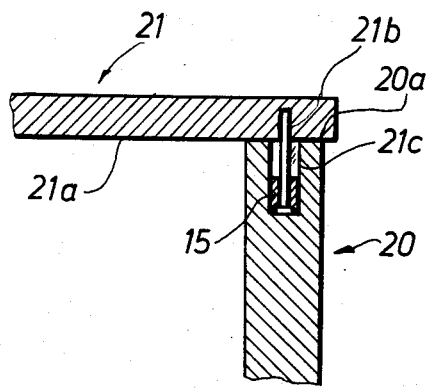
FIG. 4 is a sectional view of the embodiment of FIG. 3 taken along the line IV—IV of FIG. 3.
Figure 5:
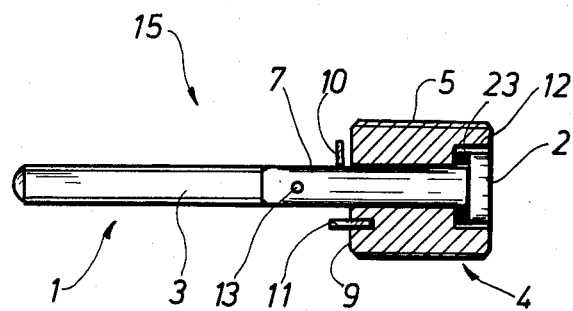
FIG. 5 is a side view of a second embodiment of the connector comprising a washer partly in section.
Figure 6:
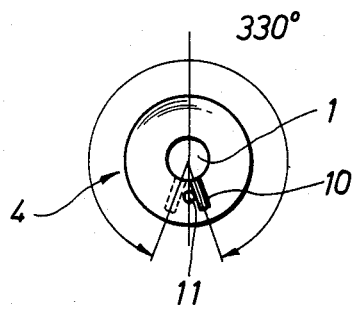
FIG. 6 is an end view of the connector, said end view showing the maximum achievable angular turning of the connector.
Figure 7:
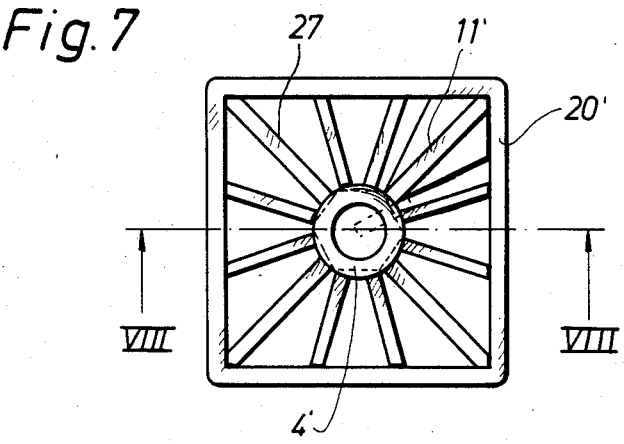
FIG. 7 is a top view of an embodiment of the connector with the bushing and the associated contact projection being integral with the table leg.
Figure 8:
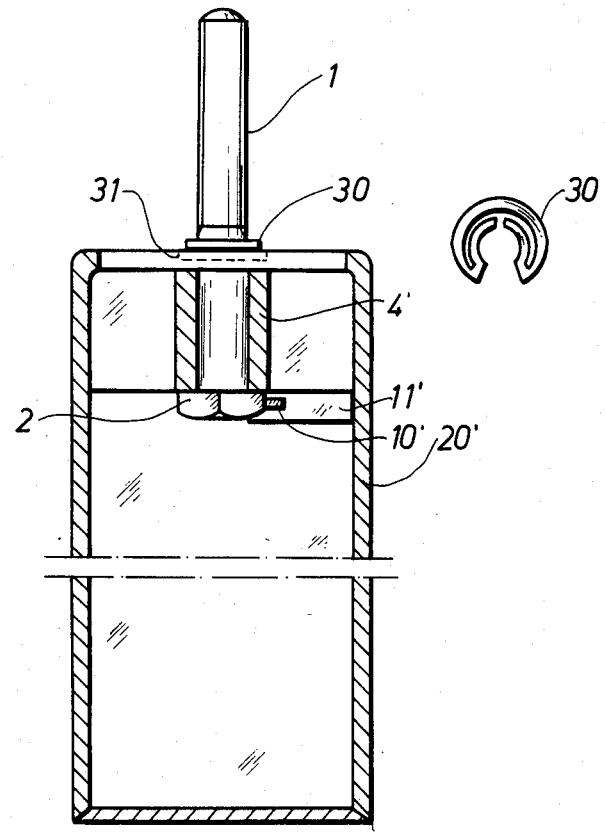
FIG. 8 is an axial sectional view of the embodiment of FIG. 7 taken along the line VIII—VIII of FIG. 7.

The connector 15 shown in FIGS. 1 and 2 serves to assemble two structural members such as a tabletop 21 and a table leg 20, cf. FIG. 3 or FIG. 4. The connector 15 of FIGS. 1 and 2 comprises a screw 1 and a bushing 4. The screw 1 comprises a relatively long shaft 3, one part of said shaft being threaded and the opposite part of which is a smooth part 7 extending to the head 2 of the screw 1. The bushing 4 comprises outer holding means 5 for instance formed by a thread, and furthermore a through hole 6 with a preferably smooth inner surface. The bushing 4 is placed on the shaft 3 of the screw 1 and is rotatably mounted about the smooth part 7 of the shaft 3. One end of the bushing 4 is provided with a countersink 12 with a terminal surface 8, the head 2 of the screw 1 abutting said terminal surface 8. A stop projection is situated in a hole on the smooth part 7 of the shaft 3, said stop projection for instance being constituted by a pin 10. As it appears the projection 10 does not project quite as far out radially as the bushing 4. Typically this projection is of a length of 5–6 mm. The pin 10 abuts or almost abuts the terminal surface 9 of the bushing 4, and in this manner an axial movement between the bushing 4 and the screw 1 is prevented. The latter is due to the fact that the movement of the bushing 4 to one side is prevented by the projection 10 and to the other side by the head 2, however, possibly apart from what corresponds to a slight clearance. A contact knob in the form of a projection 11 is situated in a hole in the terminal surface of the bushing 4, said projection 11 projecting axially from the terminal surface 9 and typically projecting 4–5 mm. In the embodiment shown the bushing 4 and the screw 1 can be turned an angle of about 330° relative to one another without causing an axial displacement therebetween because this turning angle appears as 360° minus the angle corresponding to the angular area covered by the projection 10 and the projection 11, i.e. corresponding to the total width of the projection 10 and the projection 11. A transverse and through hole 13 is provided on the smooth part 7 of the shaft 3 of the screw 1, said hole receiving a mounting tool. This hole allows a screwing in of the bushing 4 into a predrilled hole in one structural member such as a table leg 20 in such a manner that the table leg 20 and the connector 15 form an assembled unit before the table leg is secured to the tabletop. Instead of being screwed into the table leg 20 the bushing 4 may be cast therein. The table leg 20 may for instance be made of styrene butadiene S/B whereby it is able to absorb impacts in a better manner than previously. When the table leg 20 is to be secured to the tabletop 32 the table leg 20 is turned about its longitudinal axis in such a manne that the threaded part of the shaft 3 of the screw 1 is screwed into a suitable hole 21b in the tabletop 21 until the terminal surface 20a of the table leg 20 abuts the bottom side 21a of the tabletop 21 and the desired tightening has been achieved. Now it is possible to perform a subsequent adjustment, cf. the more detailed explanation below. When the table leg 20 is turned about its longitudinal axis into its final position, cf. FIG. 3, the right angle of the triangle 22, i.e. the cross section of the table leg, must correspond to the right angle of the table corner, and the latter is only possible once for every 360° turning of the table leg 20 relative to the table corner. During the screwing-in procedure, the projections 10 and 11 of FIG. 2 abut one another, and when the desired tightening between the tabletop 21 and the table leg 20 has been achieved (dash lines in FIG. 3), the table leg can be turned backwards about its longitudinal axis into a position where the right angle of the triangle 22 corresponds to the right angle of the corner of the tabletop 21 (solid line in FIG. 3), because bushing 4 can slip relative to smooth portion 7 of the shaft 3. A maximum turning corresponds to by an angle of about 350°, preferably 330° backwards, is possible without changing the tightening force between the table leg 20 and the tabletop 21. If it is attempted to turn the leg more than the maximum angle, i.e. when the projections 10 and 11 abut one another again, cf. FIG. 6, the tightening force is reduced "as bushing 4 can no longer slip with respect to portion 7, but the entire screw 1 is now being turned backwards." An angular turning substantially less than the maximum 330° is in most cases sufficient for achieving the desired and correct positioning of the table leg 20, i.e. the right angle of the table leg 20 opposes the right angle of the corner of the tabletop. A washer 23 may be provided in the through hole 6 of the bushing 4, cf. FIG. 5. This washer allows an axial prestressing between the bushing 4 and the screw 1, whereby the table leg 20 is able to absorb unexpected impacts. It should be mentioned that the holding means 5 of the bushing 4 may be formed in other ways than as threads but in such a manner that the bushing 4 is secured reliably to the table leg in another manner than by a screwing in. A second embodiment of the connector according to the invention appears from FIGS. 7 and 8. According to this second embodiment the bushing 4' and the associated contact projection 11' are integral with a hollow table leg 20', cf. FIG. 8. The bushing 4' is permanently connected to the table leg 20' by means of ribs 27 projecting from the bushing 4', cf. FIG. 7. One of these ribs 27 is reinforced and projects further downwards than the remaining ribs 27 and forms thereby the contact projection 11'. The stop projection 10' is situated on the head 2 of the screw 1 in such a manner that it abuts the projection 11. The screw 1 is axially retained by means of a locking disk 30 situated in a groove on the shaft 3 of the screw 1 and abutting one terminal surface of the bushing 4', optionally as indicated by a dotted line at 31 in a reinforced portion. A simple embodiment of the connector and associated table legs has now been achieved, and the screwing thereof onto the tabletop is performed as previously described.

I claim:

1. A connector for connecting two elements, such as a table top and a table leg, said connector comprising: an elongated shaft having a threaded portion and a relatively smooth portion connected to said threaded portion; a bushing extending around said smooth portion; cooperating stop means on said bushing and said shaft for limiting rotation of said bushing around said smooth portion to an angle of less than 360°; and means for fixing said bushing axially in position on said smooth portion, whereby said bushing may be connected to one of said elements, the threaded portion screwed into the other element until the two elements tightly engage each other, and the one element rotated into a desired angular position with respect to the other element.

2. A connector according to claim 1, wherein said cooperating stop means comprises a pin at an end face of said bushing adjacent the threaded portion, and a projection on said shaft.

3. A connector according to caim 2, wherein said fixing means comprises said projection and a screw head connected to said first portion of said shaft.

4. A connector according to claim 2, wherein said projection extends radially outwardly as far as said bushing.

5. A connector according to claim 2, wherein the axial length of said pin substantially corresponds to the axial length of said projection on said shaft.

6. A connector according to claim 2, wherein the thickness of said projection is such that said angle is limited to 330° to 340°.

7. A connector according to claim 1, wherein said shaft has a transverse hole between said bushing and said threaded portion, for receiving a mounting tool.

8. A connector according to claim 3, comprising a resilient member between said screw head and said bushing.

9. A connector for connecting two elements, such as a table top and a table leg, said connector comprising: an elongated shaft having a threaded portion and a relatively smooth portion connected to said threaded portion; a bushing on one of said elements and extending around said smooth portion; cooperating stop means on said bushing and said shaft for limiting rotation of said smooth portion relative to said bushing to an angle of less than 360°; and means for fixing said shaft axially in position on said one element, whereby said shaft may be passed through said bushing, the threaded portion may be screwed into the other element until the two elements tightly engage each other, and the one element rotated into a desired angular position with respect to the other element.

10. A connector according to claim 9, wherein said shaft has a screw head, said stop means includes a projection on said screw head, said shaft has a circumferential groove adjacent said smooth portion, and said fixing means includes a locking disc in said groove, and said screw head.

11. A connector according to claim 10, comprising a plurality of ribs connecting said bushing to said one element, and said top means includes an extension on one of said ribs.

* * * * *